(12) United States Patent
Tang et al.

(10) Patent No.: US 8,249,221 B2
(45) Date of Patent: Aug. 21, 2012

(54) ACCESS APPARATUS AND METHOD FOR DIGITAL SUBSCRIBER LINE TEST

(75) Inventors: Li Tang, Shenzhen (CN); Enbo Feng, Shenzhen (CN); Xiongwei Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1432 days.

(21) Appl. No.: 11/780,156

(22) Filed: Jul. 19, 2007

(65) Prior Publication Data

US 2008/0080675 A1   Apr. 3, 2008

(51) Int. Cl.
*H04M 1/24* (2006.01)
*H04M 3/08* (2006.01)
*H04M 3/22* (2006.01)

(52) U.S. Cl. ..... 379/9; 379/9.04; 379/10.01; 379/15.01; 379/27.01; 379/29.01

(58) Field of Classification Search ............... 379/1.01, 379/1.03, 1.04, 9.06, 15.01, 19, 27.01, 27.06, 379/27.07, 28, 29.01, 320, 322, 325, 326–329, 379/9, 9.04, 10.01
See application file for complete search history.

(56) References Cited

U.S. PATENT DOCUMENTS

| | | | | |
|---|---|---|---|---|
| 2004/0257090 | A1* | 12/2004 | Barr et al. | 324/537 |
| 2005/0105472 | A1* | 5/2005 | Squillante et al. | 370/247 |
| 2005/0231882 | A1* | 10/2005 | Schmitt et al. | 361/119 |
| 2006/0176825 | A1* | 8/2006 | Huang et al. | 370/241 |
| 2006/0177042 | A1* | 8/2006 | Fadler et al. | 379/327 |
| 2007/0121792 | A1* | 5/2007 | Chong | 379/1.01 |
| 2007/0189464 | A1* | 8/2007 | Schmitt et al. | 379/1.01 |
| 2007/0230667 | A1* | 10/2007 | Warner et al. | 379/27.01 |
| 2008/0298262 | A1* | 12/2008 | Yang et al. | 370/251 |
| 2009/0210554 | A1* | 8/2009 | Schmitt et al. | 709/237 |
| 2010/0128768 | A1* | 5/2010 | Gibala et al. | 375/224 |

FOREIGN PATENT DOCUMENTS

| | | |
|---|---|---|
| CN | 1571521 | 1/2004 |
| CN | 1725713 | 1/2004 |
| CN | 2662542 Y | 12/2004 |
| EP | 1 650 900 A1 | 4/2006 |
| WO | WO 2005079106 A1 * | 8/2005 |
| WO | WO 2006/015350 A2 | 2/2006 |

OTHER PUBLICATIONS

European Search Report issued in European Patent Application No. EP 06 02 7121, mailed Feb. 2, 2008.
Chinese Office Action issued in Chinese Patent Application No. CN 2006-101404224 dated on Apr. 11, 2008.

(Continued)

*Primary Examiner* — Binh Tieu (57) ABSTRACT

The invention discloses an access apparatus and method for digital subscriber line test. The apparatus includes: one or more distributed access matrix control modules, one or more distributed access matrixes; and a power converter module. The distributed access matrix control module is connected to a test module and at least one of the one or more distributed access matrixes which is under the control of the distributed access matrix control module, and is configured to send a test task initiated by the test module to the at least one distributed access matrix and report a message from the at least one distributed access matrix to the test module. The distributed access matrix is configured to connect a tested subscriber in accordance with the test task and report an access success message to the distributed access matrix control module.

20 Claims, 4 Drawing Sheets

OTHER PUBLICATIONS

Australian Office Action, issued in Corresponding Australian Patent Application No. 2007200039, dated on Mar. 6, 2007.
Summons to attend oral proceedings pursuant to Rule 115(1) EPC dated May 20, 2009 in connection with European Patent Application No. 06 027 121.0.
Communication pursuant to Article 94(3) EPC dated Dec. 9, 2008 in connection with European Patent Application No. 06 027 121.0.
Partial Translation of Office Acytion dated Mar. 3, 2011 in connection with Chinese Patent Application No. 200710167730.0.

* cited by examiner

ACCESS APPARATUS AND METHOD FOR DIGITAL SUBSCRIBER LINE TEST

CROSS-REFERENCE TO RELATED APPLICATION

This application claims priority from Chinese Patent Application No. 200610140422.4, filed on Sep. 30, 2006, entitled "Access Apparatus and Method for Digital Subscriber Line Test", the content of which is hereby incorporated by reference in its entirety.

FIELD OF THE INVENTION

The invention relates to the technical field of digital subscriber line test, especially to an access apparatus for digital subscriber line test and an access method for digital subscriber line test.

BACKGROUND OF THE INVENTION

As communication technology develops, broadband communication services, such as Asymmetrical Digital Subscriber Line (ADSL) services, Very-high-speed Digital Subscriber Line (VDSL) services, etc., may be provided through local telephone cables that originally bore traditional narrow-band communication services such as Plain Old Telephone Service (POTS)/Integrated Services Digital Network (ISDN) services; for example, ADSL over POTS, ADSL over ISDN, VDSL over POTS, VDSL over ISDN services, etc., may be provided. By now, those services have been widely used all over the world. For convenience of description, hereinafter digit subscriber lines, such as ADSL, VDSL, and Single-pair High-bit-rate Digital Subscriber Line (SHDSL), are referred to as xDSL collectively.

Figure 1:
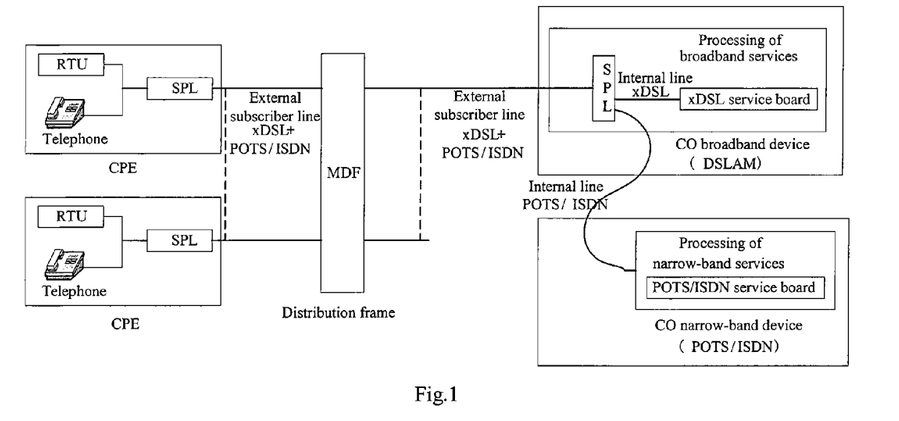
FIG. 1 shows a schematic diagram illustrating an xDSL service application.

As shown in FIG. 1, xDSL signals and POTS/ISDN signals coexist in the same external subscriber line; at the Central Office (CO) side, a splitter (SPL) in a Digital Subscriber Line Access Multiplexer (DSLAM) separates xDSL services and POTS/ISDN services, and sends xDSL services and POTS/ISDN services to an xDSL service board and a POTS/ISDN service board respectively for processing; and at the Customer Premises Equipment (CPE) side, the SPL sends the xDSL services and the POTS/ISDN services to a Remote Terminal Unit (RTU) and a telephone, respectively.

To ensure normal operation of xDSL services, it is required to detect any fault that may affect the services; therefore, the subscriber line parameters, the CPE, the CO device, etc., should be measured. The subscriber line parameters include line voltage, line resistance, line capacitance, line background noise, line-earth balance, etc.; the CO device includes a DSLAM port, a Broad-Band Access Server (BRAS), a Dynamic Host Configuration Protocol (DHCP) server, etc. With the results of the measurement, the operation of the subscriber line, CPE and CO device may be ascertained, and any fault that may affect service operation may be located and eliminated in a timely way.

Figure 2:
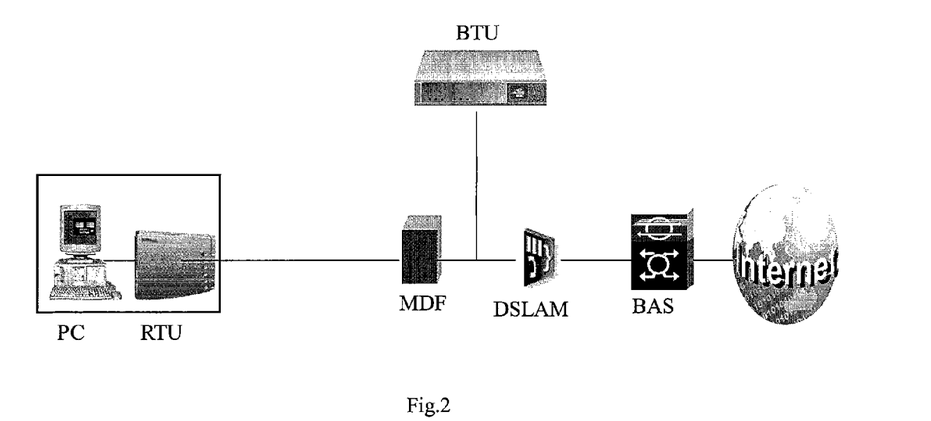
FIG. 2 shows a schematic diagram illustrating test access for xDSL services.

FIG. 2 shows a schematic diagram illustrating test access in an xDSL service network. In FIG. 2, there is shown a Personal Computer (PC), an RTU, a Main Distribution Frame (MDF), a DSLAM, a BRAS in the xDSL service network, the Internet, and a Broadband Test Unit (BTU) for test purpose. It can be seen from FIG. 2 that when the line, CPE, and CO device are to be tested, a test device, e.g., a BTU, should be connected to the xDSL service network, and such a connection shall not affect normal service operation.

However, most existing DSLAM devices are different from narrow-band switches in that they do not provide a test bus and do not support access function, i.e., they may not connect a line or the like of a tested subscriber to a test device automatically in response to a control command; therefore, it is quite difficult to implement automatic test of the DSLAMs and associated subscribers. How to settle subscriber test access for a DSLAM without a test bus and design a good automatic access method and system has significant effect on operation and maintenance of broadband services and thereby Quality of Service for the services. The following two technical solutions are employed in the prior art.

Solution 1: interpose an access device between an MDF and a CO DSLAM.

Figure 3:
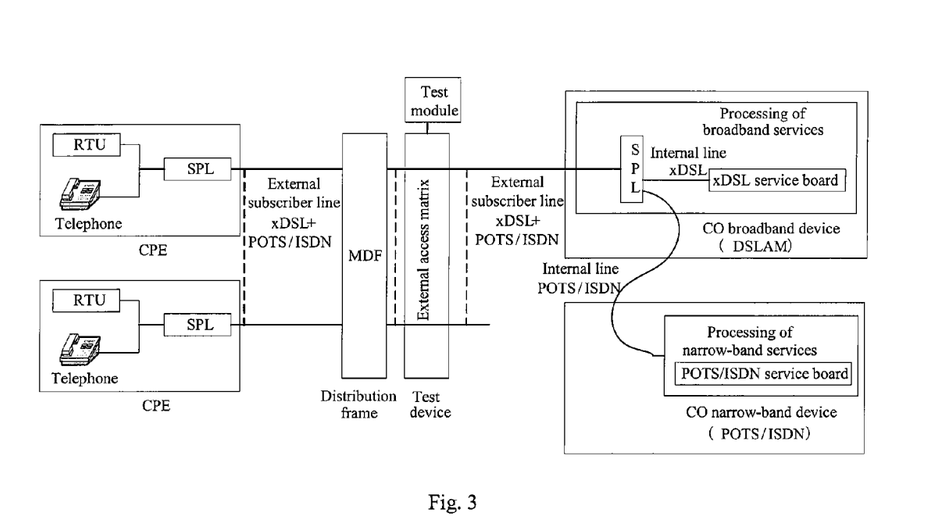
FIG. 3 shows a schematic structural diagram of solution 1 in the prior art.

As shown in FIG. 3, an access device, usually referred to as an external access matrix, is interposed between existing MDF and CO DSLAM.

The external access matrix is connected in series on the subscriber line, and shall not affect normal operation of subscriber services when there is no test to be performed. In addition, upon test, the external access matrix connects automatically a tested subscriber to a test module for test in response to a command from the control system. After the test, the external access matrix automatically releases the tested subscriber in response to a command from the control system so as to restore the line to a connection state for normal operation of services. Here, the "tested" subscriber refers to a CO device port, a line, CPE or the like.

However, in the above solution 1, for a DSLAM without a test bus, the input ports of the external access matrix shall be in a one-to-one relation to the subscribers to be tested. As a result, the higher the number of subscribers is, the larger the access device will be, and thereby the larger the equipment room area will be occupied, the higher the cost will be, and the higher engineering workload and the more complex engineering will be caused. In addition, since the external access matrix should be connected in series in an original network line, a long service downtime is needed during installation, making the services unavailable, Quality of Service for the services degraded, customer satisfaction to the operator decreased, and the operator's earnings reduced.

Solution 2: add an access matrix in a DSLAM frame.

Figure 4:
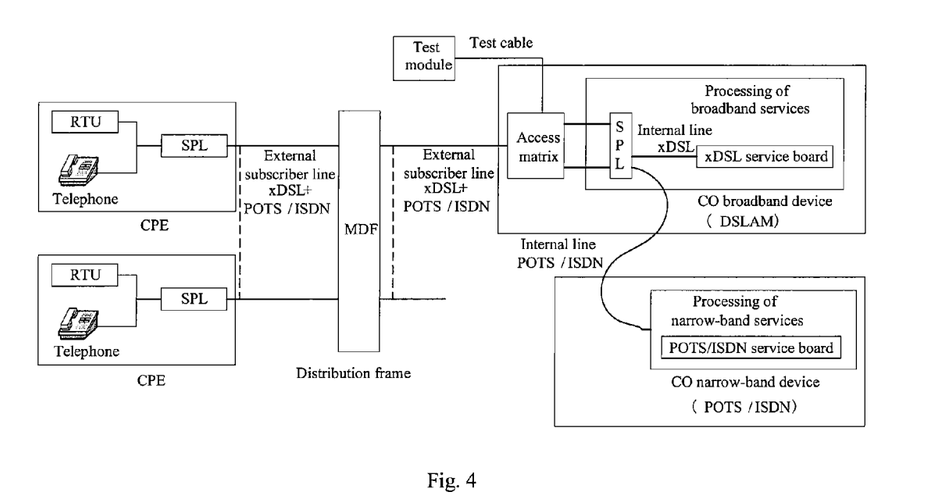
FIG. 4 shows a schematic structural diagram of solution 2 in the prior art.

As shown in FIG. 4, an access matrix is added in a DSLAM frame, i.e., an access matrix board is added in series between an SPL board and an external subscriber line.

The access matrix board is connected in series on the line and shall ensure normal operation of subscriber services when there is no test to be performed. Upon test, the access matrix board connects automatically a tested subscriber to a test module for test in response to a command from the control system. After the test, the access matrix board automatically releases the tested subscriber in response to a command from the control system so as to restore the line to a connection state for normal operation of services.

However, since the access matrix board should be connected in series in an original network line, a long service downtime is needed during installation, making the services unavailable, Quality of Service for the services degraded, customer satisfaction to the operator decreased, and the operator's earnings reduced. Furthermore, due to the fact that an existing xDSL subscriber board is high in density, the corresponding access matrix board has to be large and may not be installed in a DSLAM cabinet if the DSLAM cabinet is not reconstructed, making the installation relative complex.

SUMMARY OF THE INVENTION

Some embodiments of the present invention provide an access apparatus for digital subscriber line test, which can solve the problem that a long service downtime is required during installation of an access apparatus for automatic test of a DSLAM device without a test bus. Some other embodiments of the invention provide an access method for digital subscriber line test.

An embodiment of the invention provides an access apparatus for digital subscriber line test, including: one or more distributed access matrix control modules; one or more distributed access matrixes; and a power converter module, configured to supply power for driving to the one or more distributed access matrix control modules and/or the one or more distributed access matrixes.

The distributed access matrix control module is connected to a test module and at least one of the one or more distributed access matrixes which is under the control of the distributed access matrix control module, and is configured to send a test task initiated by the test module to the at least one distributed access matrix and report a message from the at least one distributed access matrix to the test module; and the distributed access matrix is configured to connect a tested subscriber in accordance with the test task and report an access success message to the distributed access matrix control module.

The distributed access matrix control module is connected to the test module via a serial communication interface or a parallel communication interface; and/or the distributed access matrix control module is connected to the distributed access matrix via a serial communication interface or a parallel communication interface.

The distributed access matrix is connected to a digital subscriber line device via a plug-and-play structure.

The plug-and-play structure forms a part of the distributed access matrix or is provided separately.

The plug-and-play structure is a golden finger structure.

The power converter module is provided separately or forms a part of the distributed access matrix control module.

The distributed access matrix further includes a subscriber confirmation unit configured to detect whether the tested subscriber is under the control of the distributed access matrix; and if the tested subscriber is under the control of the distributed access matrix, notify the distributed access matrix to connect the tested subscriber; otherwise, notify the distributed access matrix to take no action.

The distributed access matrix control module further includes a subscriber confirmation module configured to report an access failure message to the test module when detecting the test subscriber is not under the control of any of the at least one distributed access matrix controlled by the distributed access matrix control module.

The test module is a Broadband Test Unit (BTU) or a test server; and/or the digital subscriber line device is a Main Distribution Frame (MDF) or an Internal Distribution Frame (IDF).

In the case that the apparatus includes more than one distributed access matrix control modules, the more than one distributed access matrix control module are connected in cascade; and/or in the case that more than one distributed access matrixes are under the control of the same distributed access matrix control module, the more than one distributed access matrixes are connected in cascade.

The apparatus further includes a signal relay drive module connected in the cascade link, configured to amplify the signals in the cascade link.

The distributed access matrix control module and/or the distributed access matrix further include/includes a signal relay drive unit configured to amplify the signals in the cascade link.

The distributed access matrix control module and/or the distributed access matrix further include/includes a check unit, configured to check correctness of cascading through line looping-back.

Another embodiment of the present invention provides an access method for digital subscriber line test, including: receiving, by a distributed access matrix control module, a test task initiated by a test module and sending the test task to at least one distributed access matrix under the control of the distributed access matrix control module; connecting, by the distributed access matrix, a tested subscriber in accordance with the test task and reporting an access success message to the distributed access matrix control module, which in turn reports the message to the test module.

The method further includes: reporting, by the distributed access matrix, an access success message to the distributed access matrix control module; and reporting, by the distributed access matrix control module, the access success message to the test module.

The method further includes: detecting, by the distributed access matrix, whether the tested subscriber to be connected is under the control of the distributed access matrix, and if the tested subscriber is under the control of the distributed access matrix, connecting the tested subscriber.

The method further includes: when detecting the tested subscriber is not under the control of any of the at least distributed access matrix controlled by the distributed access matrix control module, reporting an access failure message to the test module.

The method further includes: in the case that there are more than one distributed access matrix control modules, connecting the more than one distributed access matrix control modules in cascade, and/or in the case that more than one distributed access matrixes are under the control of the same distributed access matrix control module, connecting the more than one distributed access matrixes under in cascade.

The method further includes: amplifying the signals in the cascade link.

The method further includes: checking correctness of cascading through line looping-back.

It can be seen from the above technical solutions that since the access apparatus according to some embodiments of the invention is added in an xDSL service network device, such as an MDF/IDF or the like, the apparatus need not to be connected in serial in a subscriber line upon installation to implement automatic test of a DSLAM without a test bus. Therefore, the apparatus will not cause a long service downtime, and the entire access apparatus has little effect on a subscriber using broadband services during the apparatus is installed. Even if some subscriber lines drop due to environmental factors, such as manual operation errors or the like, during practical operation, the lines will be restored to a normal connection state automatically once the access apparatus has been added. In addition, in some embodiments of the invention, the apparatus is inserted in the device such as MDF/IDF or the like directly with a distributed structure. Therefore, no additional cabinet is required, and the apparatus does not occupy any additional equipment room area, resulting reduced overall cost. Furthermore, the access apparatus provided in an embodiment of the invention may be inserted directly into the device such as MDF/IDF or the like. Therefore, it need not to make any modification to the existing DSLAM and network lines, and the apparatus may be installed simply, thereby improving engineering efficiency and reducing engineering cost.

DETAILED DESCRIPTION OF THE EMBODIMENTS

Hereinafter the invention will be further detailed in embodiments, so as to make the objects, technical solutions, and advantages of the invention understood more clearly.

Figure 5:
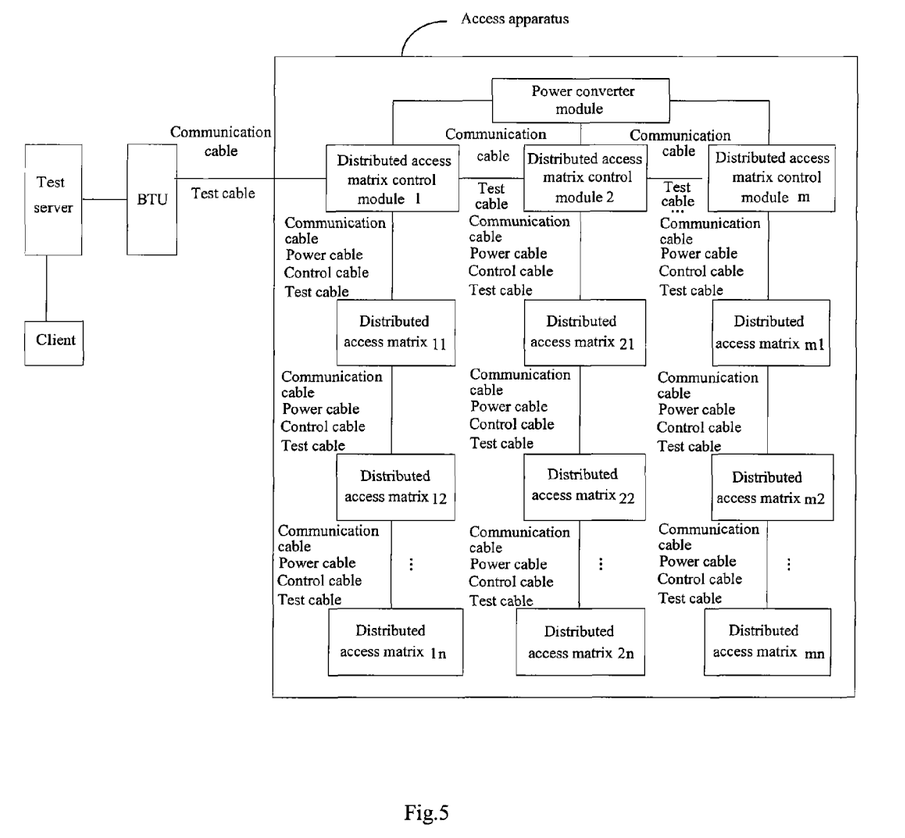
FIG. 5 shows a schematic diagram illustrating the structure of an access apparatus according to an embodiment of the invention.

FIG. 5 shows an access apparatus according to an embodiment of the invention. The apparatus is connected to a test module and an xDSL service network device. The test module may be a BTU, a test server, etc. The xDSL service network device may be an MDF, an Internal Distribution Frame (IDF). Hereinafter an MDF is described as an example.

Referring to FIG. 5, the access apparatus mainly includes one or more distributed access matrix control modules, also referred to as separate access matrix control modules, each of which is connected to one or more distributed access matrixes, also referred to as separate access matrixes, under the control of the distributed access matrix control module, through power cables, communication cables, control cables, and test cables. FIG. 5 shows a case of m distributed access matrix control modules 1, 2, . . . , m, each of which controls n distributed access matrixes. For example, distributed access matrix control module 2 controls distributed access matrixes 21, 22, . . . , 2n. The distributed access matrix control module is mainly used to send a test task initiated by a test module to the distributed access matrixes under the control of the distributed access matrix control module and report messages from those distributed access matrixes to the test module. The distributed access matrix is mainly configured to connect a tested subscriber in accordance with the test task, report access success message to the distributed access matrix control module, and release a connected tested subscriber in response to a release message from the test module. Here, the tested subscriber may be CPE, a CO device, a subscriber line or the like.

The distributed access matrix control module may be connected to the BTU through a communication cable and a test cable by using a serial communication interface, a parallel communication interface, or any of other interfaces. The distributed access matrix control module may be connected to the distributed access matrix by using a serial communication interface, a parallel communication interface, or any of other interfaces as well. Here, the serial interface may be RS485, RS422, RS232, 10M/100M Ethernet, etc.

In the case of multiple distributed access matrix control modules, each of the distributed access matrix control modules may be connected to the BTU directly. Furthermore, in order to control more distributed access matrixes and thereby implement test access for more subscribers, in an embodiment of the invention, the multiple distributed access matrix control modules may be connected in cascade, and then one of the distributed access matrix control modules, e.g., distributed access matrix control module 1 is connected to the test module directly. In that way, it is unnecessary to connect each distributed access matrix control module to the test module directly, and the flexibility and adaptability in application of the access apparatus provided in the invention can be improved.

The access apparatus shown in FIG. 5 also includes a power converter module configured to supply power for driving to the distributed access matrix control modules and/or the distributed access matrixes. The power converter module may be provided separately as shown in FIG. 5 and connected to each of the distributed access matrix control modules so as to supply power to the distributed access matrix control modules and the distributed access matrixes. Alternatively, the power converter module may be a part of the distributed access matrix control module.

Figure 6:
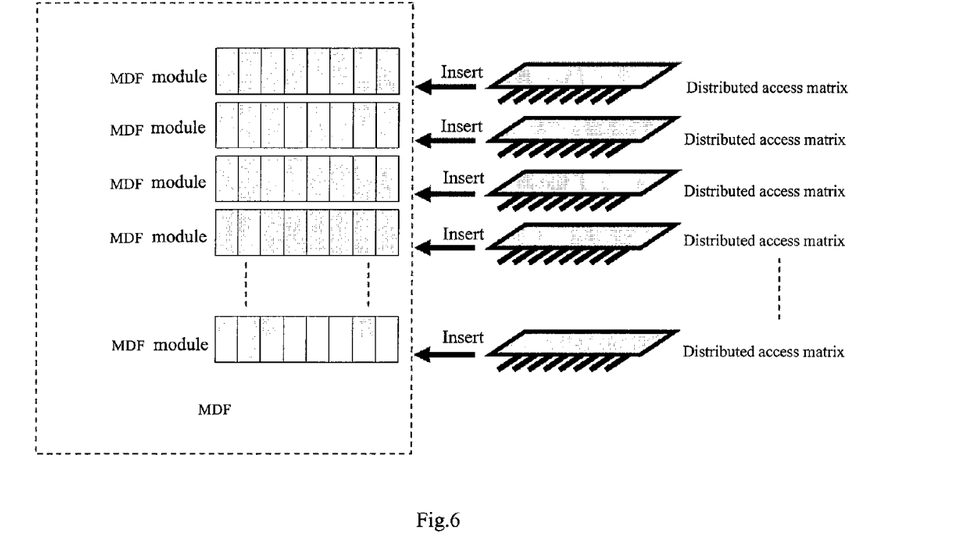
FIG. 6 shows a schematic diagram illustrating the connection between an access apparatus and an MDF according to an embodiment of the invention.

FIG. 6 shows a schematic diagram illustrating the connection between a distributed access matrix and an MDF according to an embodiment of the invention. Here the distributed access matrix is connected to the MDF in a plug-and-play way, e.g., through a golden finger structure or the like, instead of through a cable connection in the prior art. As shown in FIG. 6, a distributed access matrix is inserted into each MDF module in the MDF via a golden finger structure, and work with the internal structure of the MDF module so as to form test access. Thus it is ensured that the xDSL services may operate normally when there is no test to be performed, the tested subscriber may be connected to the test device correctly upon test, and the tested subscriber may be released correctly and restored to a connection state required for normal service operation after the test.

In addition, the structural part, e.g., a golden finger structure, of a distributed access matrix inserted into a MDF module may be integrated with other parts of the distributed access matrix, e.g., control and access circuits, etc., or provided separately therefrom. In the case of being provided separately, when the plug-and-play structure, e.g., a golden finger structure, is damaged, it only needs to replace the damaged structure instead of the whole distributed access matrix, thereby reducing the cost of maintenance. When a distributed access matrix of which the structure part, e.g., the golden finger structure, is provided separately is to be adapted to a new MDF module, if the number of the connected subscribers of the MDF module is not greater than the number of the distributed access matrixes, the control and access circuits may be shared therebetween and the adaptation may be achieved simply by modifying the structure part, e.g., the golden finger structure instead of designing the whole distributed access matrix, thereby improving the efficiency of development and reducing the cost.

Furthermore, the distributed access matrixes under the control of the same distributed access matrix control module may be connected in cascade, so that the distributed access matrix configuration may meet the demand for test access of more subscribers, eliminating the need to connect the distributed access matrix control module to each of the controlled distributed access matrixes through direct cable connection, and thereby improving the flexibility and adaptability in application of the embodiments of the invention. For example, distributed access matrixes 11, 12, . . . , 1n under the control of distributed access matrix control module 1 are connected in a cascade way in FIG. 5.

In the case that the distributed access matrix control modules or the distributed access matrixes are connected in cascade, correctness of cascading may be checked through self-looping of the test cables and looping-back of the control cables at each stage of the cascade link, in order to ensure a reliable interconnection at that stage. To this end, the distributed access matrix control module or distributed access matrix may further include a check unit, which is configured to check correctness of cascading through line looping-back.

In order to distinguish among distributed access matrix control modules as well as distributed access matrixes, in an embodiment of the invention, each distributed access matrix control module and distributed access matrix is assigned an unique node number within the cascade link thereof, so that the distributed access matrix control modules and distributed access matrixes may identify those node numbers automatically and determine whether there is any conflict. In addition, in an embodiment of the invention, multiple cascade chains are permitted for the distributed access matrix control modules or the distributed access matrixes.

The distributed access matrix may further include a subscriber confirmation unit. Upon receipt of a test task, the subscriber confirmation unit may determine whether the tested subscriber to be connected is under control of the distributed access matrix where the subscriber confirmation unit is located by comparing the node number specified in the test task and the node number of the distributed access matrix. If the node numbers match each other, it indicates the tested subscriber to be connected is under control of that distributed access matrix, and that distributed access matrix will connect the tested subscriber to the test bus; otherwise it indicates the tested subscriber to be connected is not under control of that distributed access matrix, and the subscriber confirmation unit will notify that distributed access matrix to take no action.

Similarly, the distributed access matrix control module may further include a subscriber confirmation unit. Upon receipt of a test task, the subscriber confirmation unit determines whether the tested subscriber to be connected is under the control of the distributed access matrixes under the control of the distributed access matrix control module by comparing the node number specified in the test task and the node numbers of the distributed access matrixes under the control of that distributed access matrix control module itself. If the node number specified in the test task matches the node number of a distributed access matrix under the control of that distributed access matrix control module, it indicates the tested subscriber to be connected is under the control of a distributed access matrix controlled by that distributed access matrix control module itself, and that distributed access matrix control module will operate normally, i.e., send the test task; otherwise it indicates the tested subscriber to be connected is not under the control of any of the distributed access matrixes controlled by that distributed access matrix control module itself, and the subscriber confirmation unit will report an access failure message to the test module.

If the distributed access matrix control modules and/or the distributed access matrixes are connected in cascade, the number of cascade connections among distributed access control modules or distributed access matrixes may be high, and the total length of cascading cables may be long, resulting in severe attenuation of the signals transmitted through the cables and operation abnormality of the distributed access matrix control modules or distributed access matrixes cascaded downstream. In view of this, in embodiments of the invention, the distributed access matrix control module or distributed access matrix may further include a signal relay drive unit to amplify signals in the cascade link, so that the distributed access matrix control modules or distributed access matrixes are provided with a cascaded signal drive function, ensuring the cascaded signals may be transmitted downstream correctly at each stage.

Figure 7:
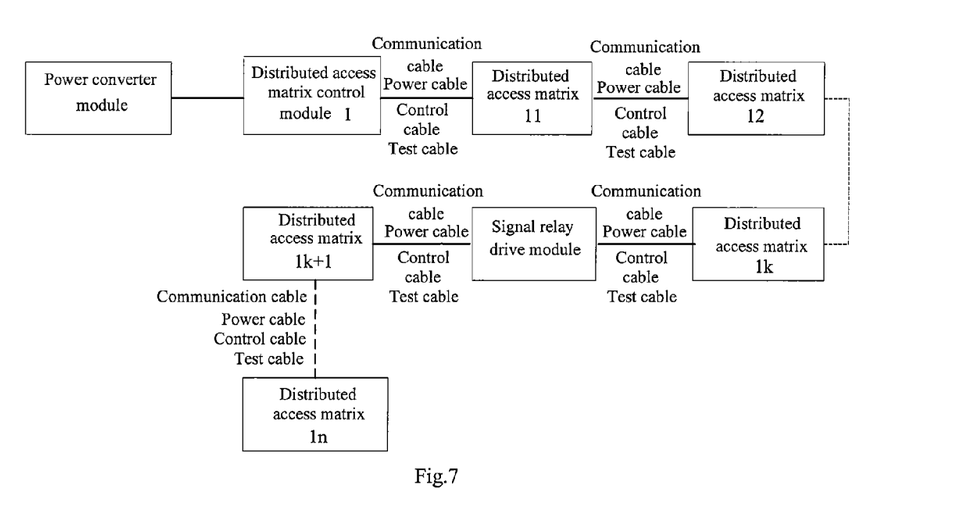
FIG. 7 shows a schematic diagram of an access apparatus with a signal relay drive module added therein according to an embodiment of the invention.

In addition, in order not to modify the structure of a distributed access matrix control module or distributed access matrix, a separate signal relay drive module may be added in the cascade link to amplify the signals in the cascade link, as shown in FIG. 7, so as to solve the problem that the large number of cascades among the distributed access matrixes results in severe attenuation of the cascaded signals, ensuring the cascaded signals may be transmitted downstream correctly at each stage. As shown in FIG. 7, distributed access matrixes $11, 12, \ldots, 1n$ under the control of distributed access matrix control module 1 are connected in cascade, and a signal relay drive module is connected in series between distributed access matrix $1k$ and distributed access matrix $1k+1$, which amplifies the signals passing through the distributed access matrix $1k$ and feeds the amplified signals to the distributed access matrix $1k+1$.

A process of test access by employing the access apparatus shown in FIG. 5 is as follows.

In the case of cascade configuration, correctness of cascading may be checked first of all. Under the control of the test module, the cascaded distributed access matrix control modules and distributed access matrixes check correctness of cascading through looping-back at each stage and/or check correctness of the node numbers assigned for each module.

During the process of the test access, the test module initiates a test task, which usually includes an access command, information of the tested subscriber, node number of the distributed access matrix where the tested subscriber is located, node number of the distributed access matrix control module that controls that distributed access matrix, etc. The test module sends the access command and the information of the tested subscriber via a communication interface to the distributed access matrix control module for the distributed access matrix where the tested subscriber is located. The distributed access matrix control module sends the test task containing the subscriber information via a communication interface and a control interface to all distributed access matrixes under the control of the distributed access matrix control module itself.

When a distributed access matrix receives the test task, the subscriber confirmation unit detects whether the tested subscriber is under the control of the distributed access matrix in accordance with the subscriber location information contained in the test task. If it is, the distributed access matrix will connect the tested subscriber to the test bus; otherwise the subscriber confirmation unit will notify the distributed access matrix to take no action.

After successful access, the distributed access matrix reports an access success message to the distributed access matrix control module. The distributed access matrix control module reports the access success message to the test module, notifying the test module may initiate the test.

In addition, if the subscriber confirmation unit of the distributed access matrix control module finds the tested subscriber is not under the control of any of the distributed access matrixes controlled by the distributed access matrix control module itself, the subscriber confirmation unit will report an access failure message to the test module.

After the test, the test module sends a message for releasing the test subscriber to the distributed access matrix via the distributed access matrix control module. Upon receipt of the message, the distributed access matrix releases the tested subscriber.

Furthermore, in the case of a large number of cascade stages, a separate signal relay drive module may be added in the cascade link, or a signal relay drive unit may be added in each distributed access matrix control module or distributed access matrix, in order to prevent the severe attenuation in the cables from affecting normal operation of the modules cascaded downstream. During the process of the test access, the signal relay drive module or the signal relay drive units may amplify the signals in the cascade link and improve signal quality, thereby ensuring normal operation of the modules cascaded downstream.

The present invention has been described with reference to the preferred embodiments above, which are not intended to limit the invention. Any modification, equivalent replacement or improvement made within the spirit and principle of the invention shall fall into the scope of the invention.

What is claimed is:

1. An access apparatus for digital subscriber line test, comprising:
   one or more distributed access matrix control modules;
   one or more distributed access matrixes; and
   a power converter module, configured to supply power for driving to the one or more distributed access matrix control modules and/or the one or more distributed access matrixes,
   wherein the distributed access matrix control module is connected to a test module and at least one of the one or more distributed access matrixes which is under the control of the distributed access matrix control module, and is configured to send a test task initiated by the test module to the at least one distributed access matrix and report a message from the at least one distributed access matrix to the test module, and
   the distributed access matrix is configured to connect a tested subscriber in accordance with the test task and report an access success message to the distributed access matrix control module;
   wherein the distributed access matrix is connected to a digital subscriber line device via a plug-and-play structure, and wherein the plug-and-play structure is a golden finger structure.

2. The apparatus according to claim 1, wherein the distributed access matrix control module is connected to the test module via a serial communication interface or a parallel communication interface.

3. The apparatus according to claim 1, wherein the distributed access matrix control module is connected to the distributed access matrix via a serial communication interface or a parallel communication interface.

4. The apparatus according to claim 1, wherein the plug-and-play structure forms a part of the distributed access matrix or is provided separately.

5. The apparatus according to claim 1, wherein the power converter module is provided separately or forms a part of the distributed access matrix control module.

6. The apparatus according to claim 1, wherein the distributed access matrix further comprises:
   a subscriber confirmation unit, configured to detect whether the tested subscriber is under the control of the distributed access matrix; and if the tested subscriber is under the control of the distributed access matrix, notify the distributed access matrix to connect the tested subscriber; otherwise, notify the distributed access matrix to take no action.

7. The apparatus according to claim 1, wherein the distributed access matrix control module further comprises a subscriber continuation module configured to report an access failure message to the test module when detecting the test subscriber is not under the control of any of the at least one distributed access matrix controlled by the distributed access matrix control module.

8. The apparatus according to claim 1, wherein the test module is a Broadband Test Unit (BTU) or a test server; and/or
   the digital subscriber line device is a Main Distribution Frame (MDF) or an Internal Distribution Frame (IDF).

9. The apparatus according to claim 1, wherein in the case that the apparatus comprises more than one distributed access matrix control modules, the more than one distributed access matrix control module are connected in cascade; and/or
   in the case that more than one distributed access matrixes are under the control of the same distributed access matrix control module, the more than one distributed access matrixes are connected in cascade.

10. The apparatus according to claim 9, further comprising a signal relay drive module connected in the cascade link, configured to amplify the signals in the cascade link.

11. The apparatus according to claim 9, wherein the distributed access matrix control module and/or the distributed access matrix further comprise/comprises a signal relay drive unit configured to amplify the signals in the cascade link.

12. The apparatus according to claim 9, wherein the distributed access matrix control module and/or the distributed access matrix further comprise/comprises a check unit, configured to check correctness of cascading through line looping-back.

13. The apparatus according to claim 1, wherein the test module is separated from the access apparatus for digital subscriber line test.

14. An access method for digital subscriber line test, comprising:
   receiving, by a distributed access matrix control module, a test task initiated by a test module and sending the test task to at least one distributed access matrix under the control of the distributed access matrix control module;
   wherein the distributed access matrix is connected to a digital subscriber line device via a plug-and-play structure, and wherein the plug-and-play structure is a golden finger structure;
   connecting, by the distributed access matrix, a tested subscriber in accordance with the test task.

15. The method according to claim 14, further comprising:
   reporting, by the distributed access matrix, an access success message to the distributed access matrix control module;
   reporting, by the distributed access matrix control module, the access success message to the test module.

16. The method according to claim 14, further comprising: detecting, by the distributed access matrix, whether the tested subscriber to be connected is under the control of the distributed access matrix, and if the tested subscriber is under the control of the distributed access matrix, connecting the tested subscriber.

17. The method according to claim 14, further comprising: when detecting the tested subscriber is not under the control of any of the at least distributed access matrix controlled by the distributed access matrix control module, reporting an access failure message to the test module.

18. The method according to claim 14, further comprising: in the case that there are more than one distributed access matrix control modules, connecting the more than one distributed access matrix control modules in cascade, and/or in the case that more than one distributed access matrixes are under the control of the same distributed access matrix control module, connecting the more than one distributed access matrixes in cascade.

19. The method according to claim 18, further comprising: amplifying the signals in the cascade link.

20. The method according to claim 18, further comprising: checking correctness of cascading through line looping-back.

* * * * *

UNITED STATES PATENT AND TRADEMARK OFFICE
CERTIFICATE OF CORRECTION

PATENT NO. : 8,249,221 B2  
APPLICATION NO. : 11/780156  
DATED : August 21, 2012  
INVENTOR(S) : Li Tang, Enbo Feng and Xiongwei Ren Page 1 of 1

It is certified that error appears in the above-identified patent and that said Letters Patent is hereby corrected as shown below:

Title page, after the sub-heading "Prior Publication Data", please insert the following:

-- (30) Foreign Application Priority Data

Sep. 30, 2006 (CN) ........................ 200610140422.4 --

Signed and Sealed this  
Second Day of July, 2013

Teresa Stanek Rea  
*Acting Director of the United States Patent and Trademark Office*